Jan. 8, 1957  G. FUCHS  2,776,728
CENTRALIZED LUBRICATION FOR HYDRAULICALLY DRIVEN MACHINES
Filed June 8, 1954
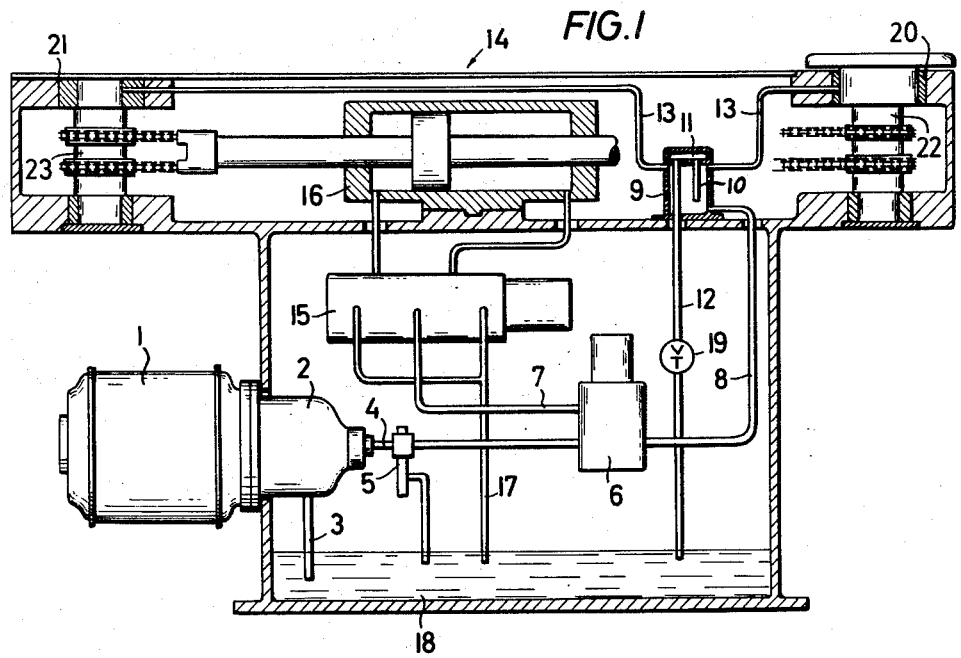
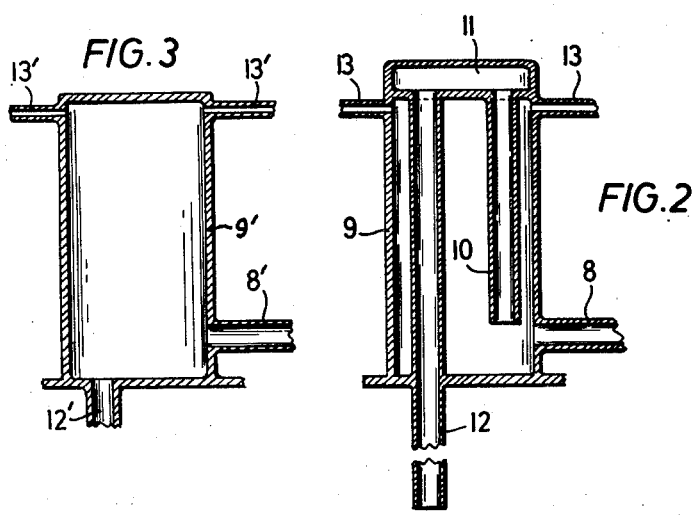
INVENTOR.
Gerhard Fuchs
BY United States Patent Office 2,776,728
Patented Jan. 8, 1957

2,776,728

CENTRALIZED LUBRICATION FOR HYDRAULICALLY DRIVEN MACHINES

Gerhard Fuchs, Rondorf, near Koln, Germany, assignor to Hilgers Maschinen- und Apparate-Bauanstalt mit beschränkter Haftung, Rodenkirchen, near Koln, Germany, a German company Application June 8, 1954, Serial No. 435,265

Claims priority, application Germany June 24, 1953

6 Claims. (Cl. 184—6)

This invention relates to a centralized lubrication system for hydraulically driven machinery, especially tube-bending machines and other machine tools.

The primary object of my invention is to make it possible to use the pressure liquid of hydraulic machines for lubrication purposes. My invention applies primarily to machines in which the pressure pump continues operating during idle periods, and the oil returns directly to the sump. However, it may also be applied to machines with hydraulic accumulator.

To the accomplishment of the foregoing and other more specific objects which will appear hereinafter, my invention consists in a centralized lubrication system for hydraulically driven machines, the elements of this system, and the relation of these elements one to the other, as are more particularly described in the specification and sought to be defined in the claims.

In order that the present invention may be fully understood, illustrative embodiments are hereinafter described in detail, by way of example, and shown in the accompanying drawing in which Fig. 1 is a diagrammatic view of the fluid-conducting system, according to my invention, also schematically showing a fluid-operated machine in section;

Fig. 2 is a part of the fluid system shown in Fig. 1, drawn to enlarged scale; and Fig. 3 shows a modification of the part of Fig. 2.

Referring to the drawing, and initially to Fig. 1, the hydraulic machine which may be of any type is shown to be a tube-bending machine. It is generally designated 14 and is hydraulically operated by means of a hydraulic power system. A motor 1 drives a pump 2 which takes in oil through a suction pipe 3 and discharges the oil through a pipe 4 at a more or less high pressure. There is a safety valve 5 in the line 4 which line leads to a case 6. This case contains flow control means, for instance, a slide to be actuated manually or mechanically. The flow control means may be adjustable. During the operation of the machine, the oil flows at full pressure through the line 7 to the valve cylinder 15 and the working cylinder 16 of the machine. The oil returns at more or less zero pressure through the pipe 17 to the reservoir 18 from which it is again drawn through the line 3 after having passed through a filter. The lines 4 and 7 form the supply line.

During idle periods, the flow control means in the casing 6 is switched to make the oil coming from the pump 2 flow through the side line 8 to the bottom of the closed intermediate vessel 9 (see also Fig. 2). From here, the oil flows through the dipping tube 10 into the upper vessel 11 from which it finally flows through the pipe 12 to the abovementioned reservoir.

In the pipes 10 and 12, as well as in the intermediate vessels 9 and 11, the oil has always to overcome a certain resistance. Such resistance may be further increased by placing a throttle, such as 19, for example, into the line 12. Consequently, a certain damming pressure will be produced in the intermediate vessel 9 during the idle periods, which pressure is sufficient to make part of the oil branch off through the oil ducts 13 and flow to the various lubricating locations, such as the upper bearings 20 and 21 of the tube-bending shaft 22 and reversing shaft 23, respectively. It is, of course, possible also to lubricate other bearings in this way, for instance, the lower bearings of the two shafts 22 and 23.

The vessel 9' shown in Fig. 3 serves similar purposes as the vessels 9 and 11 of Fig. 2. A line 8' leads into, and a line 12' leads from, the vessel 9'. Oil ducts 13' branch off to lubrication points of the machine.

It is believed that my invention, as well as the construction of the specific embodiments shown in the drawing and described hereinbefore, and the advantages thereof, will be fully understood. Some of the features and advantages of the invention are reviewed hereinafter.

During idle periods, oil flows through the oil ducts to the lubrication points of the machine under a pressure, the magnitude of which depends on the resistance offered to the flow in the side line, intermediate vessel or vessels, the discharge line, and the dipping tube if existent. Usually the normal pressure drop between the side and discharge lines is sufficient to produce such pressure as is needed for the lubrication. If this is not the case, it is, of course, possible to provide a suitable throttle behind the points at which the oil ducts branch off.

The side line may, for example, lead to a container from near the top of which the ducts branch off to the lubrication points, whereas the rest of the oil, not used for lubrication, flows out through a pipe with an opening near the bottom of the container. Any air bubbles collect at the top of the container and will be discharged with the lubricating oil at the lubricating points. The oil recycled to the reservoir will be positively free of air.

A dipping tube may be arranged to enter another pressure vessel at or near the bottom of the latter. The oil flows out through another pipe in the bottom of this second vessel which is preferably located on a higher level.

The two vessels may also be combined to form a unitary structure having a common wall, and providing a horizontal partition through which the dipping tube passes.

Practical experiments carried out, for instance, with tube-bending machines have shown that according to my invention a perfect oil supply to all bearings is achieved.

It will be apparent that while I have shown and described my invention in a number of forms, many changes and modifications may be made without departing from the spirit of the invention defined in the following claims.

I claim:

1. Centralized lubrication system for hydraulically driven machinery, including a reservoir as the hydraulic source of supply, a fluid system including a supply line, a side line, at least a single closed vessel, fluid ducts, and a discharge system, means to draw fluid from said reservoir to be supplied to the machinery under pressure through the supply line, flow control means disposed in the supply line, said side line connecting the flow control means and said closed vessel and serving to carry fluid during idle periods to the closed vessel, said fluid ducts branching off from the closed vessel near the top of the vessel and leading to locations of lubrication, a discharge pipe discharging from nearer the bottom of the vessel into the reservoir and forming a part of the discharge system, the resistance offered to the flow of the fluid in the closed vessel and in the discharge system causing part of the side line fluid to flow to the lubrication locations.

2. In the lubrication system according to claim 1, means adapted to increase the said resistance to the flow of the fluid.

3. In the system according to claim 2, said resistance-increasing means being adjustable.

4. In the lubrication system according to claim 1, two closed vessels, one being arranged on a higher level than the other, the side line entering the lower vessel, the fluid ducts being provided to leave the lower vessel near the top of the latter, a dipping pipe extending from near the bottom of the lower vessel through the bottom of the upper vessel, and a discharge pipe leaving the upper vessel at the bottom of the latter, the dipping and discharge pipes forming parts of said discharge system.

5. In the system according to claim 4, the two vessels forming a unit.

6. In the system according to claim 5, the two vessels having a common side wall and being separated by a partition, the dipping pipe entering the upper vessel through the partition, and the discharge pipe leaving the upper vessel at the partition.

References Cited in the file of this patent

UNITED STATES PATENTS

| | | |
|---|---|---|
| 1,968,188 | Winkler | July 31, 1934 |
| 2,021,066 | Huxford | Nov. 12, 1935 |
| 2,369,428 | Berg | Feb. 13, 1945 |